(12) United States Patent
Amin et al.

(10) Patent No.: US 10,936,612 B2
(45) Date of Patent: Mar. 2, 2021

(54) SYSTEM AND METHOD FOR TRANSMITTING ELECTRONIC PLUMBING FIXTURE DATA AND HEALTH DATA TO A USER DEVICE FOR TRANSMISSION OVER A NETWORK

(71) Applicant: Sloan Valve Company, Franklin Park, IL (US)

(72) Inventors: Parthiv Amin, St. Charles, IL (US); Panagiotis Zosimadis, Toronto (CA)

(73) Assignee: Sloan Valve Company, Franklin Park, IL (US)

(*) Notice: Subject to any disclaimer, the term of this patent is extended or adjusted under 35 U.S.C. 154(b) by 0 days.

(21) Appl. No.: 16/415,568

(22) Filed: May 17, 2019

(65) Prior Publication Data

US 2019/0354535 A1    Nov. 21, 2019

Related U.S. Application Data

(60) Provisional application No. 62/672,839, filed on May 17, 2018.

(51) Int. Cl.
| | |
|---|---|
| *G06F 16/25* | (2019.01) |
| *G06F 16/23* | (2019.01) |
| *H04Q 9/00* | (2006.01) |
| *A47K 17/00* | (2006.01) |

(52) U.S. Cl.
CPC .............. *G06F 16/25* (2019.01); *A47K 17/00* (2013.01); *G06F 16/2365* (2019.01); *H04Q 9/00* (2013.01); *H04Q 2209/40* (2013.01)

(58) Field of Classification Search
CPC ...... G06F 16/15; G06F 16/2365; G06F 16/25; A47K 17/00; H04Q 9/00
See application file for complete search history.

(56) References Cited

U.S. PATENT DOCUMENTS

| | | | |
|---|---|---|---|
| 2002/0007510 | A1 | 1/2002 | Mann |
| 2002/0046292 | A1* | 4/2002 | Tennison ................ H04L 45/00 709/238 |
| 2003/0227385 | A1 | 12/2003 | Lancaster |
| 2014/0330845 | A1* | 11/2014 | Feldschuh ............. G06F 16/215 707/749 |
| 2016/0077530 | A1 | 3/2016 | Moran et al. |
| 2016/0161310 | A1* | 6/2016 | Leaders .................. G01F 1/663 702/48 |
| 2018/0143598 | A1* | 5/2018 | Tahan .................. G01M 3/2807 |
| 2019/0310762 | A1* | 10/2019 | Jouhikainen .......... G06F 40/109 |

OTHER PUBLICATIONS

International Search Report for related International Application No. PCT/US2019/032891; action dated Jul. 24, 2019; (12 pages).

* cited by examiner

*Primary Examiner* — Curtis B Odom
(74) *Attorney, Agent, or Firm* — Banner & Witcoff, Ltd.

(57) ABSTRACT

An EPF digital record transmission system may be configured to transmit an EPF digital record from an EPF device to a user device. The user device may then transmit the EPF digital record to a host server for storage and processing. The EPF device may also be configured to transmit health data and the user device may be configured to analyze one or both of the health data and the EPF digital record and present a health recommendation.

20 Claims, 5 Drawing Sheets

SYSTEM AND METHOD FOR TRANSMITTING ELECTRONIC PLUMBING FIXTURE DATA AND HEALTH DATA TO A USER DEVICE FOR TRANSMISSION OVER A NETWORK

PRIORITY INFORMATION

The present application claims priority to application of U.S. Provisional Patent Application No. 62/672,839 filed on May 17, 2018, the disclosure of which is incorporated herein by reference for all purposes.

BACKGROUND

Electronic plumbing fixtures and fittings (EPFs) are increasingly used in bathrooms and other plumbing installations. EPFs can monitor plumbing devices' usage rates and operating conditions and can enable system operators to better predict when a specific device may need more maintenance. EPFs can also record information that may be useful to other users of the plumbing devices. For these features to be successfully implemented, a reliable interface for retrieving information from the EPFs must be established.

SUMMARY

The present disclosure presents new and innovative systems and methods for transmitting EPF digital records to a host server. In a first aspect, an electronic plumbing fixture (EPF) is provided comprising a measuring device, a processor, and a memory. The memory may be configured to store instructions that, when executed by the processor cause the processor to record EPF information with the measuring device, store the EPF information in an EPF digital record, detect a nearby user device configured to transmit the EPF digital record to a host server; and transmit the EPF digital record to the nearby user device along with routing information that enables the nearby user device to transmit the EPF digital record to the host server.

In a second aspect according to the first aspect, the host server is further configured to merge the EPF digital record into an EPF database by identifying duplicated portions of the EPF digital record, wherein the duplicated portions are portions of the EPF digital record already present in the EPF database, removing the duplicated portions from the EPF digital record prior to merging the EPF digital record into the EPF database, identifying conflicting portions of the EPF digital record, wherein the conflicting portions are portions of the EPF digital record that conflict with data already present in the EPF database, and resolving any conflict between the conflicting portions and the data already present in the EPF database.

In a third aspect according to any of the previous aspects, the EPF information includes one or more of: a battery level of the EPF, a cycle count for the EPF, a maintenance level for the EPF, usage data for the EPF, a water usage information for the EPF, and service information for the EPF.

In a fourth aspect according to any of the previous aspects, the EPF is further configured to transmit user health data to the nearby user device.

In a fifth aspect according to the fourth aspect, the user health data includes one or more of a handwashing count and a bathroom usage count.

In a sixth aspect according to any of the previous aspects, the EPF is located in an area with limited internet connectivity and the nearby user device is configured to transmit the EPF digital record to the host server after leaving the area with limited internet connectivity.

In a seventh aspect according to the sixth aspect, the area with limited internet connectivity is a bathroom.

In an eighth aspect according to the fourth and/or fifth aspects, the nearby user device is further configured to provide a health alert based on the health data.

In a ninth aspect according to any of the previous aspects, the EPF further comprises one or more of an electronic faucet, an electronic flushometer, an electronic pipe fitting, an electronic flow measurement device, an electronic water closet flushometer, an electronic urinal flushometer, an electronic soap dispenser, an electronic paper towel dispenser, and an electronic hand dryer.

In a tenth aspect according to any of the previous aspects, the nearby user device includes one or more of a mobile phone, smart watch, fitness tracker, laptop, or other personal computing device.

In an eleventh aspect according to any of the previous aspects, the location of the EPF is determined based on the location of the nearby user device.

In a twelfth aspect, a system is provided comprising an electronic plumbing fixture (EPF) configured to create an EPF digital record and transmit the EPF digital record via a first communication interface, a user device configured to receive the EPF digital record from the EPF and transmit the EPF digital record via a second communication interface, and a host server configured to receive the EPF digital record transmitted by the user device.

In a thirteenth aspect according to the twelfth aspect, the host server is further configured to merge the EPF digital record into an EPF database by identifying duplicated portions of the EPF digital record, wherein the duplicated portions are portions of the EPF digital record already present in the EPF database, removing the duplicated portions from the EPF digital record prior to merging the EPF digital record into the EPF database, identifying conflicting portions of the EPF digital record, wherein the conflicting portions are portions of the EPF digital record that conflict with data already present in the EPF database, and resolving any conflict between the conflicting portions and the data already present in the EPF database.

In a fourteenth aspect according to one or both of the twelfth and thirteenth aspects, the EPF digital record includes one or more of: a battery level of the EPF, a cycle count for the EPF, a maintenance level for the EPF, usage data for the EPF, a water usage information for the EPF, and service information for the EPF.

In a fifteenth aspect according to any of the twelfth to fourteenth aspects, the user device is further configured to receive user health data from the EPF.

In a sixteenth aspect according to any of the twelfth to fifteenth aspects, the EPF is located in an area with limited internet connectivity and the user device is configured to transmit the EPF digital record to the host server after leaving the area with limited internet connectivity.

In a seventeenth aspect according to the sixteenth aspect, the area with limited internet connectivity is a bathroom.

In an eighteenth aspect according to the fifteenth aspect, the user device is further configured to provide a health recommendation based on the health data.

In a nineteenth aspect according to any of the twelfth to eighteenth aspects, the EPF comprises one or more of an electronic faucet, an electronic flushometer, an electronic pipe fitting, an electronic flow measurement device, an electronic water closet flushometer, an electronic urinal flushometer, an electronic soap dispenser, an electronic paper towel dispenser, and an electronic hand dryer.

In a twentieth aspect according to any of the twelfth to nineteenth aspects, the location of the EPF is determined based on the location of the user device.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
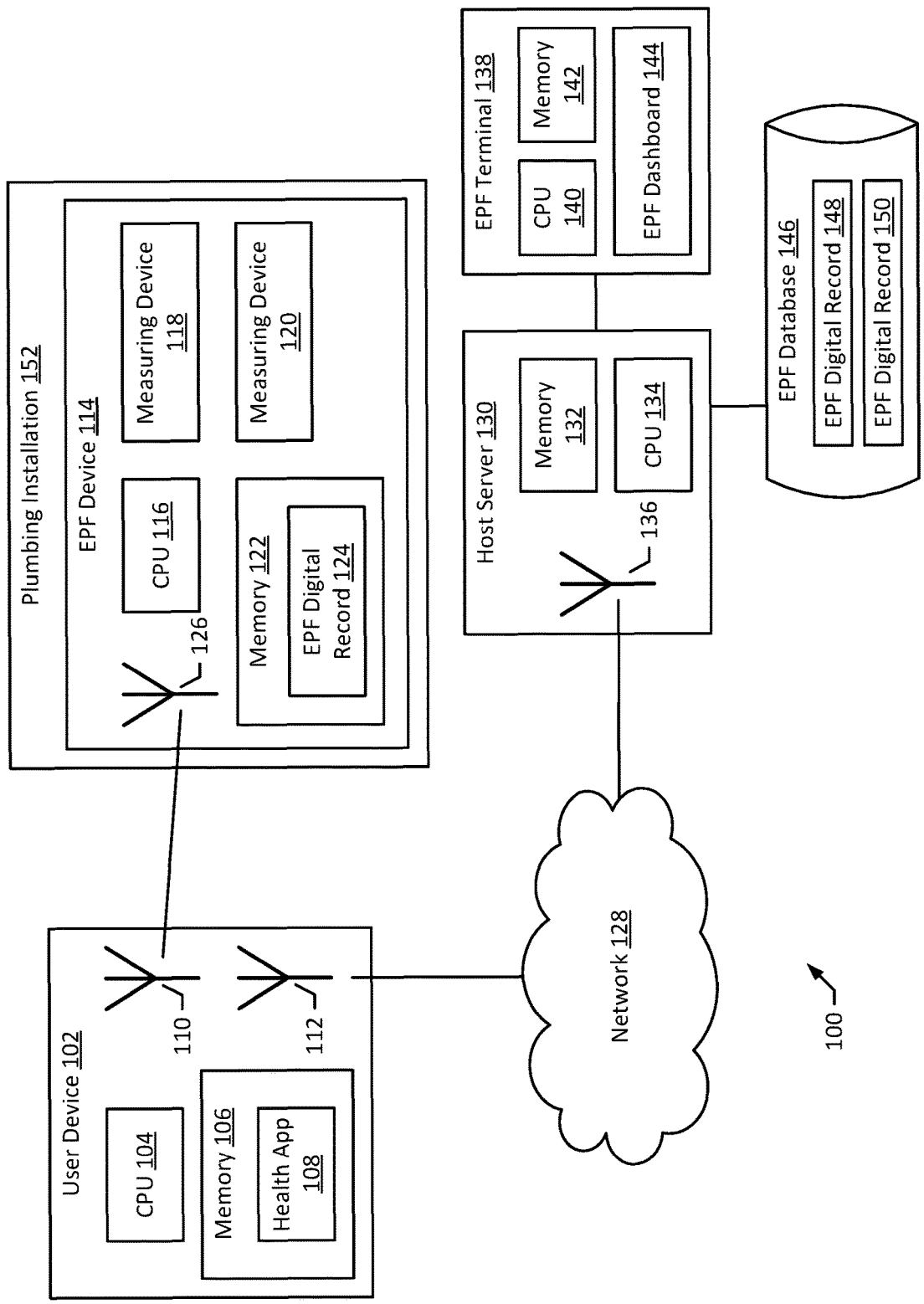
FIG. 1 illustrates a block diagram of a system according to an example embodiment of the present disclosure.

EPFs may be connected to many different devices in a typical plumbing installation. For example, EPFs may be connected to a water closet or urinal flush valve, a sink faucet, a pipe valve, or a coupler. EPFs may also be connected to other non-plumbing devices that are typically used in conjunction with plumbing installations, such as a soap dispenser or a hand dryer. An EPF may monitor usage or operating information for the devices the EPF connects to. For example, an electronic flushometer may monitor the number of times the water closet has been flushed in a given period, as well as information associated with each usage (e.g., date, time, amount of water used). Other monitored information may include the temperature of the water flowing through a pipe fitting or the parameters of a control unit associated with a fitting.

EPFs may also enable additional features, such as automatically flushing a water closet or dispensing soap. Some of these features may also enable greater control for plumbing system operators by, for example, enabling them to adjust the amount of water used in each flush or the amount of soap dispensed with each use. Other additional features may include purging the lines of a plumbing installation using a remote "line purge" function and remote monitoring of the information recorded by the EPFs.

In order to properly receive and utilize this information, however, the EPFs must have a reliable way to transmit the information to a central location. Typical methods of communicating with EPFs include wireless interfaces such as Wi-Fi or Bluetooth. But these methods are not always reliable. For example, Wi-Fi networks have a limited range that may not extend to cover a bathroom or other plumbing installation. Bluetooth connections also have a limited range that makes regular collection tedious or impractical.

As described in the examples below, one way to solve these problems is to use the smartphones and other user devices of individuals entering an area near the EPFs to collect and asynchronously upload the data collected by the EPFs to a server that can analyze or present the collected EPF data when the smartphone connects to the Internet. Typically, using such user devices to transport and upload this data requires user permission. One way to incentivize users to agree to perform this operation is to tie it to a user benefit, including health monitoring. EPF data can include information that may be useful in certain health or other applications. Therefore, it may be useful to offer access to EPF-enabled health data in exchange for also uploading the data to a central server. This health data may include information such as which EPF devices a user has interacted with, the time spent utilizing each EPF device, and when each EPF device was used. For example, the health data may include time spent washing hands, water usage during handwashing, soap usage during handwashing, time of day for a handwashing event, time spent in a water closet, time of day for a water closet usage, time spent at a urinal, and time of day for a urinal usage. In certain embodiments, the custodian or owner of the health data may include an entity who owns or provides the health app 108, a clinician or administrator enforcing a handwashing protocol, a health provider, or the individual user associated with the user device 102, 206.

For example, individuals or organizations may be interested in monitoring hand washing behavior. Such organizations may include healthcare companies, schools, restaurants or any other organization with an interest in encouraging their employees to follow a proper hand-washing protocol. In one example, a restaurant may want to ensure that employees involved in handling food wash their hands before returning to work in the kitchen. In another example, a hospital may want to ensure that employees such as doctors or nurses wash their hands when moving from patient to patient or after visiting a patient with a contagious ailment. In another example, individuals may be interested in tracking one or more health behaviors, including handwashing, urination frequency, and bowel movement frequency. In exchange for providing the EPF data and the health data to perform the above-described functions, users may agree to collect and asynchronously upload the data collected by the EPFs to a server that can analyze or present the collected EPF data when their smartphone connects to the Internet.

In other words, in order to enable an EPF device to deliver EPF data to a host server, the EPF device may handshake with one or more user devices. After handshaking, the user device may download the data from the EPF device prior to the user walking away from the EPF device. After walking away, during a regular data transmission of the user device, the EPF data may be "muled" onto the transmission and sent along with the regular data transmission to the host server. Once on the host server and in the cloud, the regular data transmission may be unbundled by a pre-arranged sharing system that unbundles the EPF data and ships it to the host server. The EPF data may then be received at the host server and assembled to create an individual record for an EPF device. The individual record may then be routed to an owner app associated with the EPF device in order to display the monitored parameters.

FIG. 1 depicts a block diagram of a system 100 according to an example embodiment of the present disclosure. The system 100 includes a user device 102, an EPF device 114, a network 128, a host server 130, an EPF terminal 138, and an EPF database 146. The user device 102 includes a CPU 104, a first communication interface 110, a second communication interface 112, and a memory 106 containing a health app 108. The EPF device 114 includes a CPU 116, measuring devices 118, 120, a communication interface 126, and a memory 122 containing an EPF digital record 124. The EPF device 114 is associated with a plumbing installation 152 and is connected via the communication interface 126 to the first communication interface 110 of the user device 102. The host server 130 includes a memory 132, a CPU 134, and a communication interface 136. The host server 130 is connected to the user device 102 via the network 128. The host server 130 is also connected to the EPF terminal 138, which contains a CPU 140, a memory 142, and an EPF dashboard 144. The host server 130 is further connected to the EPF database 146 containing EPF digital records 148, 150.

The EPF device 114 may be configured to measure and record information associated with one or more fixtures, fittings, or other devices in the plumbing installation 152. For example, a fixture may include any vessel associated with the plumbing installation 152, including a water closet, a urinal, and a sink basin. A fitting may include an endpoint delivery device associated with the plumbing installation 152, including a flushometer, electronic faucet, manual faucet, electronic soap dispenser, electronic hand dryer, and electronic paper towel dispenser. The plumbing installation 152 may include a bathroom, kitchen, or any other area that would benefit from improved plumbing monitoring. The EPF device 114 may record the information with the measuring devices 118, 120 and these measuring devices may measure different aspects of the plumbing installation 152. For example, measuring device 118 may measure the flow-rate through a fitting while measuring device 120 measures the water temperature. The measuring devices 118, 120 may also measure the pressure, supply levels, battery level, service information, or other information. Although two measuring devices 118, 120 are depicted, other embodiments of the system 100 may include more or fewer measuring devices. After the measuring devices 118, 120 detect information regarding the plumbing installation 152, the EPF device 114 may store the information in an EPF digital record 124, which may be stored in the memory 122. Over time, the EPF device 114 may measure and collect multiple pieces of information on the plumbing installation 152. Subsequent measurements may be added to the EPF digital record 124 with an indication of the date and time of the measurement and recording. The EPF device 114 may use the communication interface 126 to transmit a copy of the EPF digital record 124 to the user device 102 as described further below. To perform these tasks, the memory 122 may contain a series of instructions which, when executed by the CPU 116, cause the CPU 116 to perform one or more of the above steps. The EPF device 114 may be implemented as one or more of an electronic faucet, an electronic flushometer, an electronic pipe fitting, an electronic flow measurement device, an electronic water closet flushometer, an electronic urinal flushometer, an electronic soap dispenser, an electronic paper towel dispenser, and an electronic hand dryer.

The user device 102 may receive the EPF digital record 124 from the EPF device 114 and store the EPF digital record 124 in the memory 106. The user device 102 may process the EPF digital record 124 with the health app 108 to extract health data from the EPF digital record 124 associated with the user. This health data may subsequently be used to generate health recommendations. Alternatively, the EPF device 114 may separately transmit health data to the user device 102. As described above, the first communication interface 110 may be used to communicate with the EPF device 114. The first communication interface 110 may be implemented as one or more of a Wi-Fi connection, a Bluetooth connection, a ZigBee connection, or any other wired or wireless communication interface. The second communication interface 112 may be used to communicate with the network 128 and may be implemented with one or more wired or wireless communication interfaces as described above, including a cellular data connection. In some embodiments, the user device 102 may have an additional communication interface other than the communication interfaces 110, 112. In other embodiments, the user device 102 may have only a single communication interface used to connect to both the EPF device 114 and the network 128. For example, in some embodiments, the user device 102 may connect to the EPF device using Wi-Fi and subsequently connect to the network 128 using Wi-Fi. To perform these tasks, the memory 106 may contain a series of instructions which, when executed by the CPU 104, cause the CPU 104 to perform one or more of the above steps. The user device 102 may be implemented as one or more of a smartphone, a smart watch, a fitness wearable, a laptop, a tablet, or any other smart wearable or personal computing device.

The network 128 may receive an EPF digital record 124 from the user device 102 and route the EPF digital record 124 to the host server 130. In some embodiments, the network 128 may be the Internet or a local wired or wireless network. For example, in one embodiment the host server may be physically located far from the plumbing installation 152 and the user device 102. In such an embodiment, the network 128 may be the Internet to enable the user device 102 to transmit the EPF digital record 124 over the distance to the host server 130. In other embodiments, the host server 130 may be located near the plumbing installation 152, such as in the same building as the plumbing installation 152. In such embodiments, the network 128 may be a local network within the building that the user device 102 connects to via Wi-Fi.

The host server 130 may be configured to receive the EPF digital record 124 from the user device 102 via the network 128 and store the EPF digital record in the EPF database 146. The host server may use a communication interface 136, which may be a wired or wireless communication interface. The host server 130 may be configured to detect duplicate information contained in the EPF digital record 124 that is already present in the EPF database 146. For example, it may detect information contained in the EPF digital record 124 that is already present in either or both of the EPF digital records 148, 150. The host server 130 may remove the duplicate information from the EPF digital record 124 and then store what remains of the EPF digital record 124 in the EPF database 146. The host server 130 may also be configured to detect information that conflicts with information stored in the EPF database 146, such as the information contained within the EPF digital records 148, 150. The host server 130 may then correct or remove the conflicting information before adding the EPF digital record 124 to the EPF database 146. To perform these tasks, the memory 132 may contain a series of instructions which, when executed by the CPU 134, cause the CPU 134 to perform one or more of the above steps. The host server 130 may be implemented by one or more computing systems, including multiple computing systems in separate locations connected by a network such as the network 128.

The EPF database 146 may be connected to the host server 130 directly as shown in FIG. 1, or may be connected through a network, such as the network 128. The EPF database 146 may also be contained within the host server. For example, the host server 130 may be configured with sufficient storage to enable it to act as the EPF database 146.

The EPF terminal 138 may be configured to process and display the EPF digital records 148, 150 contained within the EPF database 146. For example, the EPF terminal 138 may summarize the information contained within the EPF digital records to present a historical view of the usage, performance, and maintenance of the plumbing installation 152. Alternatively or additionally, the EPF terminal 138 may process and display the EPF digital record 124 as it is received by the host server 130.

The system 100 may be implemented as one or more computer systems. For example, the user device 102, the EPF device 114, the host server 130, and the EPF terminal 138 could be separate computer systems and the EPF database could be implemented by more than one computer system. In another embodiment, the host server 130, EPF terminal 138, and EPF database 146 may be implemented by the same computer system.

Figure 2:
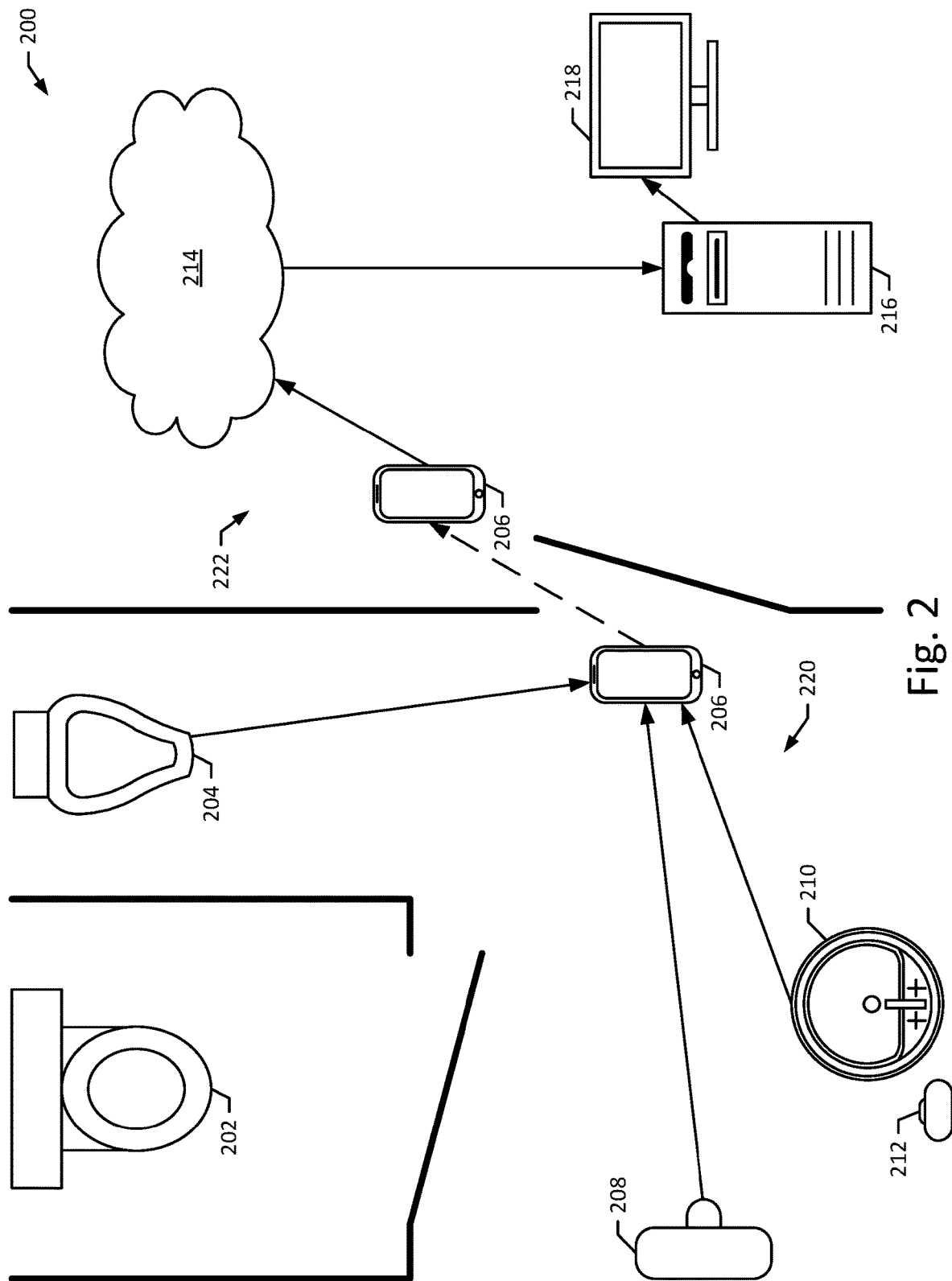
FIG. 2 illustrates an EPF digital record upload operation according to an example embodiment of the present disclosure.

FIG. 2 depicts an EPF digital record upload operation 200 according to an example embodiment of the present disclosure. The operation 200 includes an EPF area 220 and an external area 222. The EPF area 220 includes multiple EPF devices, including an electronic water closet flushometer 202, an electronic urinal flushometer 204, an electronic hand dryer 208, an electronic soap dispenser 212, and an electronic faucet 210. The external area 222 includes a network 214, a host server 216, and an EPF terminal 218. Both the EPF area 220 and the external area 222 include the user device 206, which moves between the two areas 220, 222.

The EPF area 220 may be any area that includes EPF devices. As depicted in FIG. 2, the EPF area 220 may be a bathroom, or may be any other area with EPF devices. In some implementations, the EPF area 220 may have limited network connectivity. For example, the EPF area 220 may be located in a building with wireless network coverage, but may be in a part of the building that does not receive a signal strong enough to reliably use the network. This may be typical of bathrooms and other areas with EPF devices. In other embodiments, the EPF area 220 may have acceptable network connectivity, but the network may not be desirable for other reasons, such as the network being run by an entity other than the plumbing system's operator, or because the network's configuration settings change regularly and it is undesirable to regularly update the changing settings. The network may also be incompatible with one or more of the EPF devices, or the network operator may not want to connect the EPF devices to the network because of network congestion concerns. Each of these reasons may make it desirable to use alternative data transmission techniques.

The EPF devices 202, 204, 208, 210, 212 may measure one or more pieces of information relating to the operation, usage, and maintenance of their associated fittings and fixtures. For example, the EPF devices 202, 204, 208, 210, 212, may measure one or more of a cycle count for a fitting or fixture, maintenance information for a fitting or fixture, a battery level for one or more fittings or fixtures, water usage information for a fitting or fixture, water usage associated with a fitting or fixture, and service information for a fitting or fixture as described in greater detail below. The EPF devices 202, 204, 208, 210, 212 may store the measured information in an EPF digital record 124 in a memory 122.

The user device 206 may include any device discussed above in connection with user device 102. Upon entering the EPF area 220, the user device 206 may detect one or more EPF devices 202, 204, 208, 210, 212. For example, as depicted, the EPF devices 204, 208, 210 may broadcast wireless signals such as Wi-Fi spectrum signals that indicate that the EPF devices 204, 208, 210 are capable of connecting to the user device 206 and exchanging information with the user device 206. When the user device 206 detects these signals, it may connect to the EPF devices 204, 208, 210 broadcasting the signals. The EPF devices 204, 208, 210 may then determine whether the user device has been opted into a program to allow the EPF devices 204, 208, 210 to transmit EPF digital records 124 to the user device 206. For example, the user device 206 may have installed a health app 108 that is configured to utilize information measured by the EPF devices 204, 208, 210 to record health activity and/or provide health recommendations. The health app 108 may be configured, for example to measure the user's handwashing activities or the number of times they urinate or have a bowel movement. The health app 108 may use information measured by the electronic faucet 210, the electronic soap dispenser 212, or the electronic hand dryer 208 to determine whether and when a user has washed their hands. The health app 108 may also use the information from the electronic water closet flushometer 202 and the electronic urinal flushometer 204 to determine whether and when a user has urinated. The health app 108 may use the information received from the EPF device to generate a health recommendation. For example, if the health app 108 determines that a user has used the restroom and has not washed their hands, the health app 108 may generate and present a recommendation that the user wash their hands. Similarly, the health app 108 may use the frequency and regularity of a user's urination to suggest that the user drink more fluid or alter their diet, based upon the appropriate bio background of the individual subscriber. In other implementations, the health app 108 may be configured to ensure the user follows a particular hand washing protocol (e.g., a minimum amount of time spent scrubbing with soap). In such an implementation, the health app 108 may be configured to present a recommendation that the user change their hand washing (or wash their hands again) in order to properly comply with the hand washing protocol.

If the EPF devices 204, 208, 210 determine that the user device 206 has the health app 108 and is enrolled in receiving EPF digital records 124, the EPF device 204, 208, 210 may proceed to transmit the EPF digital record 124 coupled with the health data to the user device 206. After receiving the EPF digital record 124 and the health data, the health app 108 may process the received EPF digital record 124 and health data as described above. In some examples, the health data may not be separately transmitted to the user device 206, but may instead be included as a portion of the EPF digital record 124. For example, the health data may simply be a subset of the EPF digital record 124 that pertains to the uses of the EPF devices 204, 208, 210 that correspond to the user. In such an implementation, the health data may be extracted from the EPF digital record 124 and stored separately on the user device 206 before processing by the health app 108 as described above. The user device 206 may also store a copy of the EPF digital record 124 in a memory, such as memory 106. Although depicted as only receiving EPF digital records 124 from the electronic urinal flushometer 204, the electronic faucet 210, and the electronic hand dryer 208, the other devices including the electronic water closet flushometer 202 and the electronic soap dispenser 212 may also be configured to transmit EPF digital records 124 to the user device 206.

Later, the user device 206 may leave the EPF area 220 and eventually enter the external area 222. As mentioned above, the external area 222 may include a host server 216, a network 214, and an EPF terminal 218. These may be implemented by the host server 130, the network 128, and the EPF terminal 138, respectively. After entering the external area, the user device 206 may connect to the host server 216 via the network 214. The network 214 may be implemented as a wired or wireless connection and may be a local network or may include a connection over an external network, such as the Internet. The user device 205 may connect to the network 214 using communication interface 112. In some embodiments, the network 214 may be available within the same building as the EPF area 220, such as a Wi-Fi network hosted by the entity or business residing in the same building as the EPF area. In other embodiments, the network 214 may be independent of the EPF area 220 and any building containing it. For example, the network 214 could be the cellular network that the user device connects to after leaving the EPF area. The network 214 could also be the user's home Wi-Fi network. In other embodiments, although the user device 206 is depicted as leaving the EPF area 220, the user device may connect to the network 214 while within the EPF area 220. For example, the network 214 may be a cellular data network that the user device 206 is connected to when it enters the EPF area 220 and remains connected to while in the EPF area 220.

Upon connecting to the host server 216 via the network 128, the user device 206 may transmit the EPF digital record 124 to the host server 216. For example, the user device 206 may separate the received EPF digital record 124 from the received health data and only upload the EPF digital record 124. As described above, the health data may also be copied from the EPF digital record 124 and stored on the user device 206 prior to upload to the host server 216. After receiving the EPF digital record 124, the host server 216 may check the EPF digital record 124 for any duplicates or conflicts with an EPF database 146 (not shown in FIG. 2). The host server 216 may then reconcile any duplicates or conflicts and store the EPF digital record 124 in the EPF database 146.

Additionally, the host server 216 may be configured to display stored EPF information, such as EPF usage, operation, and maintenance information on a terminal such as the EPF terminal 218 connected to the host server 216. The EPF terminal 218 may be a separate computer system attached to the host server 216 over a network such as the network 214, or it may be a program configured to run on the same computer system as the host server 216. Similarly, the EPF database 146 may be a separate computer system or may be configured to run on the same machine as the host server 216. The EPF terminal 218 may be configured with a user interface that displays the EPF information. For example, the EPF terminal 218 may display water usage metrics over different time intervals, such as the last day, week, month, and year. It may display similar statistics for other types of usage, such as paper towel usage, energy usage, and soap usage. The EPF terminal 218 may also display maintenance information, such as an indication of which plumbing devices are most in need of service and may flag any devices that are in immediate need of service. For example, the EPF terminal 218 may receive information stating that the electronic soap dispenser 212 is about to run out of soap and maintenance is needed to refill the electronic soap dispenser 212. Likewise, the EPF terminal 218 may determine that the electronic water closet flushometer 202 has not been serviced for a length of time greater than a typical servicing period and thus that the electronic water closet flushometer 202 is in need of maintenance. In this way, the EPF terminal 218 may enable plumbing system operators to act on the information gathered by the EPF devices 114 and transmitted within the EPF digital record 124.

Figure 3:
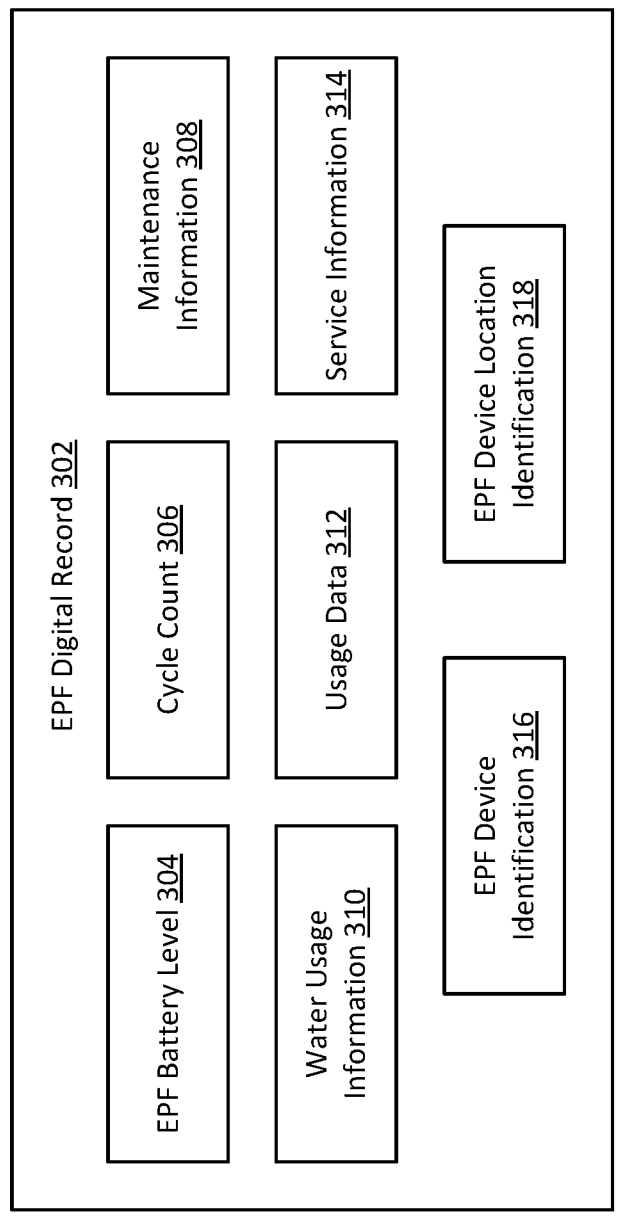
FIG. 3 illustrates an EPF digital record according to an example embodiment of the present disclosure.

FIG. 3 depicts an EPF digital record 302 according to an example embodiment of the present disclosure. The EPF digital record 302 may represent an EPF digital record 124 created by an EPF device 114 after measuring one or more items of EPF information 304, 306, 308, 310, 312, 314 in a plumbing system 152, or may represent an EPF Digital Record 148, 150 stored on a host server 130, 216. The EPF digital record 302 includes multiple items of EPF information 304, 306, 308, 310, 312, 314, 316, 318 including an EPF battery level 304, a cycle count 306, maintenance information 308, water usage information 310, usage data 312, service information 314, an EPF device identification 316, and an EPF device location identification 318. The EPF battery level 304 may include an indication of the battery level of one or more EPF devices 114, 202, 204, 208, 210, 212. For example, the battery level 304 may include a battery level measurement of the EPF device 114, 202, 204, 208, 210, 212 that created the EPF digital record 302. The cycle count 306 may include a count of the number of times one or more electronic plumbing or other electronic devices 202, 204, 208, 210, 212 in a plumbing system 152 has been used. The maintenance information 308 may include one or more indications of the status of an EPF device 114, 202, 204, 208, 210, 212 in the plumbing system 152. The water usage information 310 may include a measurement of the water usage associated with an electronic plumbing device in the plumbing system 152. The water usage may be stored as a total water usage, or as a log of water usage events that records the time and total water used during each event. The usage data 312 may include information on the usage of a plumbing or other device in the plumbing system 152. For example, similar to the water usage information 310, the usage data 312 may include the date, time, and water used each time the electronic plumbing or other device is utilized. Additionally, the usage data 312 may store other information such as the energy used or the supplies used each time the device is utilized (e.g., for a soap dispenser 208 or paper towel dispenser). The service information 314 may include information on the service status of one or more EPF devices 114, 202, 204, 208, 210, 212 in the plumbing system 152. For example, the service information 314 may include an indication of the previous times a device was serviced, along with the types of service performed. The service information 314 may also include an indication of which services may be needed or which services are soon to be needed. For example, if certain EPF devices 202, 204, 210 must be serviced every 20,000 gallons of water used, the service information 314 may include an indication that service will be needed soon if the device has used 18,000 gallons of water since its last servicing. In the same example, the service information 314 may include a service flag that the EPF device 202, 204, 210 needs service if the EPF device 202, 204, 210 has used more than 20,000 gallons of water since the last time it was serviced. The EPF device identification 316 might include a unique identification (e.g., an identification number) that identifies the EPF device 114, 202, 204, 208, 210, 212 that created the EPF digital record 302. For example, each EPF device 114, 202, 204, 208, 210, 212 may be configured with a unique identification number and may append the unique identification number as an EPF device identification 316 to the EPF digital record 302. The EPF device location identification 318 may indicate the location or area, such as the EPF area 220, that contains the EPF device 114 that created the EPF digital record 302. For example, the EPF device 114, 202, 204, 208, 210, 212 may include a GPS sensor that identifies the location of the EPF device 114, 202, 204, 208, 210, 212 and the EPF location identification 318 may include the location identified by the GPS sensor, or may identify an EPF area 220 associated with (e.g., containing) the location identified by the GPS sensor. In another example, the EPF device 114, 202, 204, 208, 210, 212 may contain a location identification of the EPF area 220 that the EPF device 114, 202, 204, 208, 210, 212 is associated with, or a stored indication of the location of the EPF device 114, 202, 204, 208, 210, 212 and may include that in the EPF device location identification 318. The EPF device 114, 202, 204, 208, 210, 212 may receive the location device from an initialization process where a technician locates the EPF device 114, 202, 204, 208, 210, 212 (e.g., by locating the device using a smartphone during setup or by the technician manually providing the EPF device location). In a further example, the EPF device 114, 202, 204, 208, 210, 212 may receive the location information from another nearby EPF device 114, 202, 204, 208, 210, 212 that has already been provided a location identification. For example, if the electronic soap dispenser 212 is installed after the electronic faucet 210 has already been initialized with a location identification, the electronic soap dispenser 212 may receive the EPF device location identification 318 from the electronic faucet 210. In a still further example, a user device 206 may supplement the EPF digital record 302 with the EPF device location identification 318 using a GPS sensor of the user device 206. In certain implementations of the above example implementations of the EPF device location identification 318, the user or technician may be prompted to add floor information to the EPF device location identification 318. For example, the EPF device 114, 202, 204, 208, 210, 212 may be installed in a building with EPF areas 220 on multiple floors. In such an example, GPS location alone may be insufficient to identify which floor the user or technician is on and the user or technician may be prompted to enter a floor in order to properly implement the EPF device location identification 318.

The EPF digital record 302 may include multiple types of EPF information 304, 306, 308, 310, 312, 314, as depicted, or may include only a single type of EPF information. For example, some EPF digital records 302 may only include service information 314. For each type of information, the EPF digital record 302 may include more than one entry. For example, for usage information 312, the EPF digital record 302 may include one entry for each time the associated plumbing device (e.g., the electronic water closet flushometer 202) is used. Each entry may include a date and time of use, and a measurement of the water used when the electronic water closet flushometer was flushed. Similarly, the EPF battery level 304 may include multiple entries reflecting a daily, hourly, or other frequency measurement of the battery level of the EPF device 114, 202, 204, 208, 210, 212. Also, each type of EPF information 304, 306, 308, 310, 312, 314 may only include information associated with the EPF device 114, 202, 204, 208, 210, 212 that created the EPF digital record 302, or may include EPF information 304, 306, 308, 310, 312, 314 measured by other EPF devices 114, 202, 204, 208, 210, 212 in communicative range of the EPF device 114, 202, 204, 208, 210, 212 that created the EPF digital record 302. For example, the battery level 304 may also include the battery level of other EPF devices in communicative range of the EPF device 114, 202, 204, 208, 210, 212 that created the EPF digital record 302.

Figure 4:
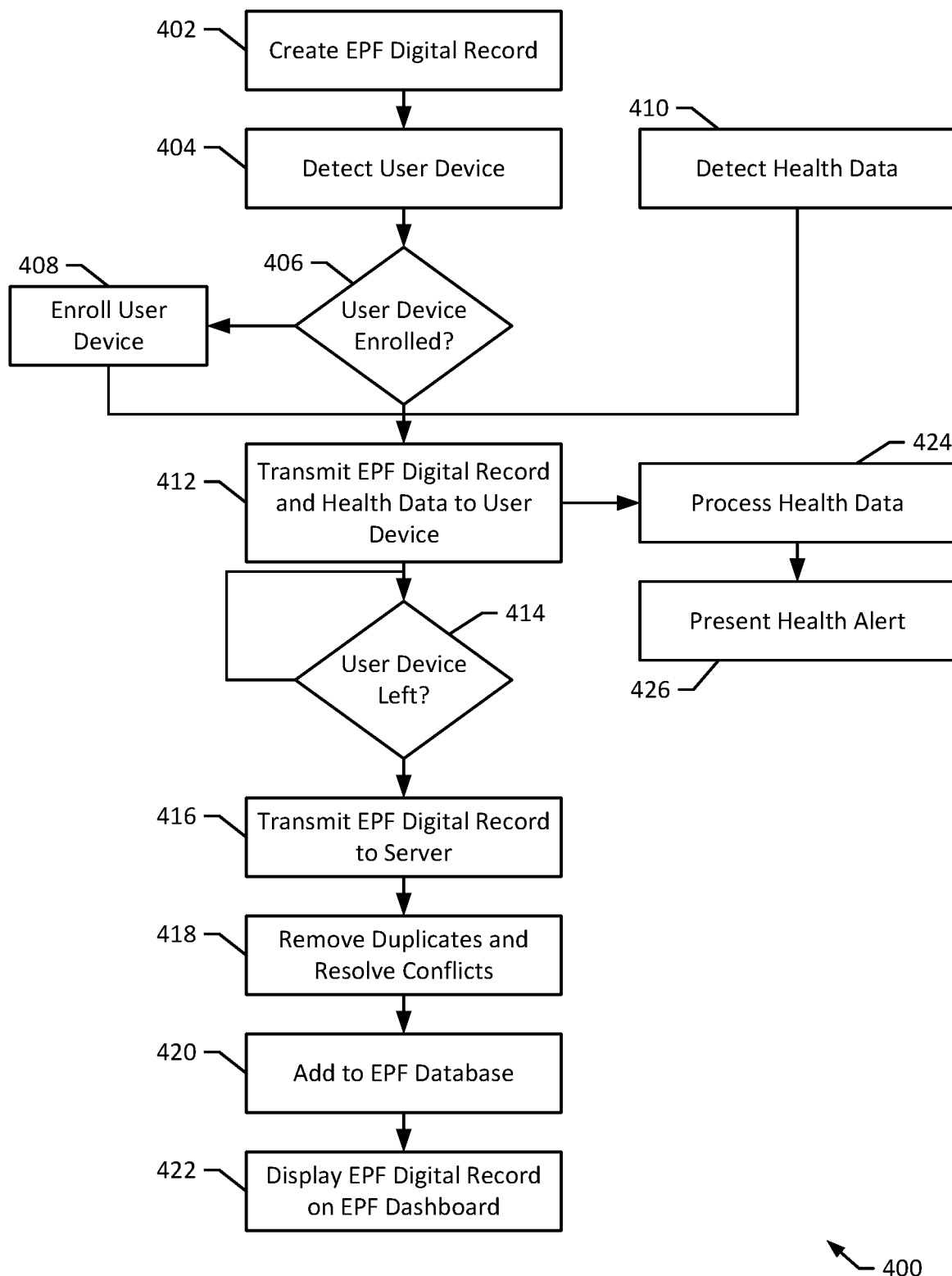
FIG. 4 illustrates a flow chart of an example method according to an example embodiment of the present disclosure.

FIG. 4 depicts a flow chart of an example method 400 according to an example embodiment of the present disclosure. The method 400, when executed, may be used to upload EPF digital records 124, 302 from EPF devices 114 to a host server 130, 216. The method 400 may also be used to process and store the EPF digital records 124, 302 in an EPF database 146. The method 400 may be implemented on a computer system, such as the system 100. For example, the method 400 may be implemented by one or more of the EPF device 114, 202, 204, 208, 210, 212, the user device 102, the network 128, the host server 130, the EPF terminal 138, and the EPF database 146. The method 400 may also be implemented by a set of instructions stored on a computer readable medium that, when executed by a processor, cause the computer system to perform the method. For example, all or part of the method 400 may be implemented by the CPUs 104, 116, 134, 140 and the memories 106, 122, 132, 142. Although the examples below are described with reference to the flowchart illustrated in FIG. 4, many other methods of performing the acts associated with FIG. 4 may be used. For example, the order of some of the steps may be changed, certain steps may be combined with other steps, one or more of the steps may be repeated, and some of the steps described may be optional.

The method 400 begins with an EPF device 114, 202, 204, 208, 210, 212 creating an EPF digital record 124, 302 (step 402). The EPF device may create the EPF digital record 124, 302 by measuring EPF information 304, 306, 308, 310, 312 using a measuring device 118, 120 as described above. The method 400 may then proceed with the EPF device 114, 202, 204, 208, 210, 212 detecting a nearby user device 102, 206 (step 404). The EPF device 114 may detect the nearby user device 102, 206 by detecting a wireless signal associated with the user device 102, 206. The detected wireless signal may be generated by the communication interfaces 110, 112 of the user device 102, 206 and may be detected by the communication interface 126 of the EPF device 114. When detecting the user device 102, 206, the EPF device 114, 202, 204, 208, 210, 212 may determine a device type for the user device 102, 206. For example, it may determine that the user device 102, 206 is a smartphone, fitness tracker, smartwatch, or other smart wearable. Once the user device is detected, the method 400 may proceed with the EPF device 114 determining whether the user device 102, 206 is enrolled in receiving EPF digital records 124, 302. As discussed above, a user device 102, 206 may enroll in receiving health data by installing a health app 108. The user device 102, 206 may also enroll by granting permission to receive and transmit EPF digital records 124, 302 without using a health app. If the user device 102, 206 is not enrolled, the method 400 may proceed to enroll the user device (step 408). The user device 102, 206 may be enrolled by installing a health app 108 compatible with the health records, or by providing the user device 102, 206 with a prompt to enroll the device by granting permission to receive and transmit EPF digital records 124, 302. If the user device 102, 206 is enrolled or after enrolling the user device 102, 206, the method 400 may proceed with the EPF device 114 transmitting the EPF digital record 124, 302 to the user device 102, 206 (step 412). The EPF device 114, 202, 204, 208, 210, 212 may transmit the EPF digital record 124, 302 to the user over a wireless communication interface, such as the first wireless communication interface 110 and the communication interface 126. In some embodiments, the method 400 may also detect health data (step 410) and transmit the health data with the EPF digital record 124. For example, in some embodiments certain EPF data such as whether a hand dryer was used may not be included in the EPF digital record 124, 302. However, this may be useful as health data because it provides further inferences as to whether the user washed their hands. Thus, in such an embodiment, health data indicating use of the electronic hand dryer 208 may be transmitted to the user device 102, 206 with the EPF digital record 124, 302. Additionally, prior to transmitting the EPF digital record 124, 302, the EPF device 114 may detect additional EPF information 304, 306, 308, 310, 312 associated with the user before transmitting the EPF digital record 124, 302. For example, the user may trigger a plumbing or other device 202, 204, 208, 210, 212 by using the electronic water closet flushometer 202 or washing their hands in the electronic faucet 210 after their user device is detected. EPF information 304, 306, 308, 310, 312, 314 related to these activities may be collected and added to the EPF digital record 124, 302 before the EPF digital record 124, 302 is transmitted to the user device 102, 206. In this way, the EPF device 114 can ensure that the most updated information is included and can ensure that the most data possible is available to the health app 108. The EPF device 114 may also repeatedly update and transmit the EPF digital record 124, 302 with EPF information 304, 306, 308, 310, 312, 314 created while the user device 206 is in the EPF area 220 for similar reasons.

Figure 5:
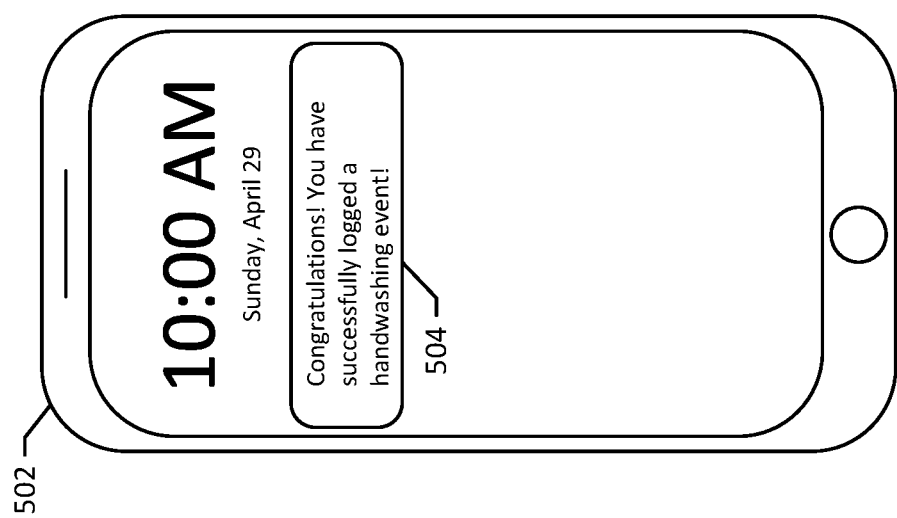
FIG. 5 illustrates a health alert according to an example embodiment of the present disclosure.

After receiving the health data, the health app 108 may process the data (step 424) and present a health alert (step 426) as described above. The health app 108 may be presented after local processing on the user device 102, 206, or after remote processing on a host server 130, 216. For example, based on the health data and the EPF digital record 124, 302, the health app 108 may determine that the user used the restroom but did not wash their hands in accordance with the requirements of a proscribed handwashing protocol. After determining this, the health app 108 could present a health alert encouraging the user to wash their hands or to wash their hands again in compliance with a handwashing protocol. Alternatively, the health app 108 could present a health alert acknowledging that the health app 108 has successfully detected a completed hand washing event. The health alert could include a visual, tactile, or audible acknowledgement of the successfully recorded handwashing event. The health alert may be presented by the user device 102, 206 or may be presented by another device such as the EPF device 114. For example, after a user successfully washes their hands, their smartphone may vibrate and present a push notification indicating that the hand washing event was successfully recorded, such as the push notification 504 of the user device 502 depicted in FIG. 5. In another example, after a user successfully washes their hands, an LED or other visual indicator on an EPF-equipped faucet may light up and/or play a noise to indicate that the hand washing event was successfully recorded within the health app 108. The health alert may also be presented at a remote device, such as the EPF terminal 138, 218. Although depicted as part of the method 400, certain embodiments of the method 400 may exclude the health app 108 and the associated steps at steps 410, 424, and 426. Such embodiments are expressly contemplated in this disclosure.

After transmitting the EPF digital record 124, 302 to the user device 102, 206 (step 412), the method 400 may then proceed with the user device 102, 206 determining whether the user device 102, 206 has left the area, such as the EPF area 220. This may be useful because further transmission of the EPF digital record 124, 302 may not be possible until the user device 102, 206 has left. For example, if the EPF device 114, 202, 204, 208, 210, 212 is located in an area with limited Wi-Fi, cellular, or other network coverage, the user device 102, 206 may have to leave the area before attempting to transmit the EPF digital record 124, 302. The user device 102, 206 may determine that the user device 102, 206 has left the EPF area 220 by measuring the strength of the wireless communication signal between the user device 102, 206 and the EPF device 114, 202, 204, 208, 210, 212. For example, the user device 102, 206 may determine that it has left the EPF area 220 when the wireless communication signal strength drops below a certain threshold or goes away. In certain instances, the user device 102, 206 determines that it has left the EPF area 220 before the transmission of EPF digital record 124, 302 has been initiated or completed and may correspondingly stop the transmission from beginning or create an indication that the EPF digital record 124, 302 has only been partially received. In other embodiments, the user device 102, 206 may determine its location while in the EPF area 220 using a location sensor such as a GPS sensor or by using cellular service location signals. The user device 102, 206 may determine it has left the EPF area when its location has changed by a certain threshold. In certain embodiments, the user device 102, 206 may augment the EPF digital record 124, 302 with similar location data.

In some embodiments, however, it may not be necessary for the user device 102, 206 to leave the EPF area 220. For example, the user device 102, 206 may be able to connect to a network 128, 214 while still within the EPF area 220. For example, the user device 102, 206 may be able to connect to the network 128, 214 using a second wireless means 112 such as a cellular network or a Wi-Fi connection. Thus, some embodiments of the method 400 may omit step 414.

The method 400 may then proceed with the user device 102, 206 transmitting the EPF digital record 124, 302 to the host server 130, 216 (step 416). The digital record 124, 302 may be transmitted to the host server 130, 216 over a network 128, 214 such as the Internet. In some embodiments, the digital records 124, 302 may be transmitted to the host server 130, 216 along with the health data in order to enable steps 424, 426 to be performed remotely on the host server 130, 216. For example, the health data may be transmitted to the host server 130, 216 with the digital records 124, 302. The host server 130, 216 may then perform the steps of steps 424, 426 as described above, or it may extract the health data and forward the health data to a health data server that performs the steps of steps 424, 426. In another example, the user device 102, 206 may separately transmit the health data to a health data server for processing as described above and may also separately transmit the EPF digital record 124, 302 to the host server. In a further embodiment, the user device 102, 206 may transmit both the health data and the EPF digital record 124, 302 to a health data server and the health data server may then transmit the EPF digital record 124, 302 to the host server 130, 216.

In other embodiments, the digital records 124, 302 may be separated from any health data transmitted by the EPF device 114 so that the user device 102, 206 only uploads the EPF digital record 124, 302. For example, the EPF digital record 124, 302 transmission may include packets that are encoded differently than the packets included in the health data transmission. When the user device 102, 206 receives the packets encoded for the EPF digital record 124, 302, it may separate these from the packets associated with the health data transmission packets. The user device 102, 206 may then only upload the packets encoded for the EPF digital record 124, 302. After receiving the EPF digital record 124, 302, the host server 130, 216 may remove any duplicates and resolve conflicts within the EPF digital record 124, 302 (step 418). The host server 130, 216 may compare the EPF digital record 124, 302 to other EPF digital records 148, 150 stored in an EPF database 146 to identify duplicates or conflicts present in the EPF digital record 124, 302. For example, each entry in the EPF digital record 124, 302 may include a unique identifier. The EPF host server 130, 216 may compare the unique identifier with the unique identifiers within the EPF digital records 148, 150 stored on the EPF database 146. If the unique identifier of an entry in the EPF digital record 124, 302 received from the user device 102, 206 matches the unique identifier within the EPF digital records 148, 150 stored on the EPF database 146, the associated entry may be removed from the EPF digital record 124, 302 as a duplicate.

Once the duplicates and conflicts are removed and resolved, the method 400 may proceed with the host server 130, 216 adding the EPF digital record 124, 302 to the EPF database 146 (step 420) and displaying information relating to the EPF digital record 124, 302 on an EPF dashboard 144 (step 422). The EPF dashboard 144 may be configured to display a user interface presenting statistics pertaining to water usage, fitting usage, consumable usage, maintenance information, and service information as discussed above in connection with EPF terminal 218, and may be implemented by an EPF terminal 138, 218.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electronic plumbing fixture (EPF) comprising:
a measuring device;
a processor; and
a memory configured to store instructions that, when executed by the processor, cause the EPF to:
record EPF information with the measuring device;
store the EPF information in an EPF digital record;
detect a nearby user device configured to transmit the EPF digital record to a host server;
perform, based on detecting the nearby user device, a handshake with the nearby user device; and
in response to completing the handshake, transmit the EPF digital record to the nearby user device along with routing information that enables the nearby user device to transmit the EPF digital record to the host server.

2. The EPF of claim 1, wherein the host server is further configured to merge the EPF digital record into an EPF database by:

identifying duplicated portions of the EPF digital record, wherein the duplicated portions are portions of the EPF digital record already present in the EPF database;
removing the duplicated portions from the EPF digital record prior to merging the EPF digital record into the EPF database;
identifying conflicting portions of the EPF digital record, wherein the conflicting portions are portions of the EPF digital record that conflict with data already present in the EPF database; and
resolving any conflict between the conflicting portions and the data already present in the EPF database.

3. The EPF of claim 1, wherein the EPF information comprises at least one of: a battery level of the EPF, a cycle count for the EPF, a maintenance level for the EPF, usage data for the EPF, a water usage information for the EPF, or service information for the EPF.

4. The EPF of claim 1, wherein the instructions, when executed by the processor, cause the EPF to:
transmit to the nearby user device and with the EPF digital record, user health data, wherein the nearby user device is configured to extract the user health data from the EPF digital record prior to transmitting the EPF digital record to the host server.

5. The EPF of claim 4, wherein the user health data comprises at least one of:
a handwashing count; or
a bathroom usage count.

6. The EPF of claim 1, wherein the EPF is located in an area with limited internet connectivity and the nearby user device is configured to transmit the EPF digital record to the host server after leaving the area with limited internet connectivity.

7. The EPF of claim 6, wherein the area with limited internet connectivity is a bathroom.

8. The EPF of claim 4, wherein the nearby user device is further configured to provide a health alert based on the user health data.

9. The EPF of claim 1, wherein the EPF further comprises at least one of: an electronic faucet, an electronic flushometer, an electronic pipe fitting, an electronic flow measurement device, an electronic water closet flushometer, an electronic urinal flushometer, an electronic soap dispenser, an electronic paper towel dispenser, or an electronic hand dryer.

10. The EPF of claim 1, wherein the nearby user device at least one of a mobile phone, smart watch, fitness tracker, laptop, or other personal computing device.

11. The EPF of claim 1, wherein a location of the EPF is determined based on the location of the nearby user device.

12. A system comprising:
an electronic plumbing fixture (EPF) configured to create an EPF digital record, perform a handshake with a user device, and transmit the EPF digital record to the user device via a first communication interface in response to completing the handshake;
a user device configured to perform the handshake with the EPF, receive the EPF digital record from the EPF in response to completing the handshake, and transmit the EPF digital record via a second communication interface; and
a host server configured to receive the EPF digital record transmitted by the user device.

13. The system of claim 12, wherein the host server is further configured to merge the EPF digital record into an EPF database by:

identifying duplicated portions of the EPF digital record, wherein the duplicated portions are portions of the EPF digital record already present in the EPF database;

removing the duplicated portions from the EPF digital record prior to merging the EPF digital record into the EPF database;

identifying conflicting portions of the EPF digital record, wherein the conflicting portions are portions of the EPF digital record that conflict with data already present in the EPF database; and resolving any conflict between the conflicting portions and the data already present in the EPF database.

14. The system of claim 12, wherein the EPF digital record comprises at least one of: a battery level of the EPF, a cycle count for the EPF, a maintenance level for the EPF, usage data for the EPF, a water usage information for the EPF, or service information for the EPF.

15. The system of claim 12, wherein the user device is further configured to:

receive user health data from the EPF; and provide a health recommendation based on the user health data.

16. The system of claim 12, wherein the EPF is located in an area with limited internet connectivity and the user device is configured to transmit the EPF digital record to the host server after leaving the area with limited internet connectivity.

17. The system of claim 16, wherein the area with limited internet connectivity is a bathroom.

18. The system of claim 15, wherein:

the user the health data as part of the EPF digital record; and user device is configured to extract the user health data from the EPF digital record prior to sending the EPF digital record to the host server.

19. The system of claim 12, wherein the EPF comprises at least one of an electronic faucet, an electronic flushometer, an electronic pipe fitting, an electronic flow measurement device, an electronic water closet flushometer, an electronic urinal flushometer, an electronic soap dispenser, an electronic paper towel dispenser, or an electronic hand dryer.

20. The system of claim 12, wherein a location of the EPF is determined based on the location of the user device.

* * * * *